(12) United States Patent
Seo

(10) Patent No.: US 7,614,975 B2
(45) Date of Patent: Nov. 10, 2009

(54) GEAR TRAIN OF AN AUTOMATIC TRANSMISSION FOR A VEHICLE

(75) Inventor: Kang Soo Seo, Suwon (KR)

(73) Assignee: Hyundai Motor Company, Seoul (KR)

( * ) Notice: Subject to any disclaimer, the term of this patent is extended or adjusted under 35 U.S.C. 154(b) by 417 days.

(21) Appl. No.: 11/602,161

(22) Filed: Nov. 20, 2006

(65) Prior Publication Data

US 2008/0103015 A1 May 1, 2008

(30) Foreign Application Priority Data

Oct. 26, 2006 (KR) ............. 10-2006-0104594

(51) Int. Cl.
*F16H 3/62* (2006.01)
(52) U.S. Cl. ............ 475/278; 475/280; 475/288
(58) Field of Classification Search ......... 475/271, 475/275, 277, 278, 279, 284, 288, 290, 311, 475/317, 323
See application file for complete search history.

(56) References Cited

U.S. PATENT DOCUMENTS 4,683,776 A * 8/1987 Klemen .......... 475/286
7,204,780 B2 * 4/2007 Klemen .......... 475/279
7,285,069 B2 * 10/2007 Klemen .......... 475/275

* cited by examiner

*Primary Examiner*—Sherry L Estremsky
*Assistant Examiner*—Edwin A. Young
(74) *Attorney, Agent, or Firm*—Morgan, Lewis & Bockius LLP

(57) ABSTRACT

A gear train of an automatic transmission for a vehicle includes first and second shifting sections and a plurality of friction members, wherein: the first shifting section includes first and second simple planetary gear sets forming a first input path for directly receiving an input shaft rotation speed and an intermediate output path for outputting a reduced speed of the first shifting section; and the second shifting section includes third and fourth simple planetary gear sets forming a first intermediate input path for variably receiving an input shaft rotation speed, a second intermediate input path for receiving the reduced speed of the first shifting section through the intermediate output path and also for variably receiving an input shaft rotation speed, and a final output path for outputting a modified speed of the second shifting section.

21 Claims, 5 Drawing Sheets

FIG.2

|  | C1 | C2 | C3 | B1 | B2 | B3 | B4 |
|---|---|---|---|---|---|---|---|
| 1st |  |  | ● | ● | ● |  |  |
| 2nd |  |  | ● |  | ● | ● |  |
| 3rd |  | ● | ● |  | ● |  |  |
| 4th | ● | ● |  |  | ● |  |  |
| 5th | ● | ● | ● |  |  |  |  |
| 6th | ● |  | ● |  |  | ● |  |
| 7th | ● |  | ● | ● |  |  |  |
| reverse 1st |  |  | ● | ● |  |  | ● |
| reverse 2nd |  |  | ● |  |  | ● | ● |

FIG.5

|  | C1 | C2 | C3 | B1 | B2 | B3 | B4 | B5 |
|---|---|---|---|---|---|---|---|---|
| 1st |  |  | ● | ● | ● |  |  |  |
| 2nd |  |  | ● |  | ● | ● |  |  |
| 3rd |  | ● | ● |  | ● |  |  |  |
| 4th | ● | ● |  |  | ● |  |  |  |
| 5th | ● | ● | ● |  |  |  |  |  |
| 6th | ● |  | ● |  |  | ● |  |  |
| 7th | ● |  | ● | ● |  |  |  |  |
| 8th | ● |  | ● |  |  |  |  | ● |
| reverse 1st |  |  | ● | ● |  |  | ● |  |
| reverse 2nd |  |  | ● |  |  | ● | ● |  |

GEAR TRAIN OF AN AUTOMATIC TRANSMISSION FOR A VEHICLE

CROSS-REFERENCE TO RELATED APPLICATION

This application claims priority to and the benefit of Korean Patent Application No. 10-2006-0104594 filed in the Korean Intellectual Property Office on Oct. 26, 2006, the entire contents of which are incorporated herein by reference.

BACKGROUND OF THE INVENTION (a) Field of the Invention

The present invention relates to a gear train of an automatic transmission for a vehicle.

(b) Description of the Related Art

A typical shift mechanism of an automatic transmission utilizes a combination of planetary gear sets. A gear train of such an automatic transmission changes rotating speed and torque received from a torque converter of the automatic transmission, and accordingly changes and transmits the changed torque to an output shaft.

When a transmission has a large number of shift speeds, speed ratios of the transmission can be more optimally designed and therefore a vehicle can have better fuel mileage and better performance.

For a given number of speeds, features of a gear train such as durability, efficiency in power transmission, and size depend a lot on the layout of the planetary gear sets.

A manual transmission with a large number of speeds causes the inconvenience of excessively frequent shifting operations by the driver. Therefore, gear trains with large numbers of shift-speeds lend themselves better to automatic transmissions.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a gear train with improved power transmission performance and reduced fuel consumption.

An exemplary embodiment of the present invention provides a gear train of an automatic transmission for a vehicle having first and second shifting sections and a plurality of friction members, wherein: the first shifting section includes first and second simple planetary gear sets forming a first input path for directly receiving an input shaft rotation speed and an intermediate output path for outputting a reduced speed of the first shifting section; and the second shifting section includes third and fourth simple planetary gear sets forming a first intermediate input path for variably receiving an input shaft rotation speed, a second intermediate input path for receiving the reduced speed of the first shifting section through the intermediate output path and also for variably receiving an input shaft rotation speed, and a final output path for outputting a modified speed of the second shifting section.

Each of the first, second, third, and fourth planetary gear sets may be a single pinion planetary gear set.

A sun gear of the first planetary gear set may be directly connected with a sun gear of the second planetary gear set, and a ring gear of the first planetary gear set may be directly connected with a planet carrier of the second planetary gear set, such that the first shifting section includes four operational elements: a first operational element formed by the sun gears of the first and second planetary gear sets; a second operational element formed by a planet carrier of the first planetary gear set; a third operational element formed by the ring gear of the first planetary gear set and the planet carrier of the second planetary gear set; and a fourth operational element formed by a ring gear of the second planetary gear set.

The fourth operational element may be directly connected with an input shaft so as to form the first input path. The third operational element may form the intermediate output path. The first and second operational elements may selectively act as a fixed element.

A ring gear of the third planetary gear set may be directly connected with a planet carrier of the fourth planetary gear set, and sun gears of the third and fourth planetary gear sets may be variably interconnected, such that the second shifting section includes four operational elements: a fifth operational element formed by a ring gear of the fourth planetary gear set; a sixth operational element formed by the ring gear of the third planetary gear set and the planet carrier of the fourth planetary gear set; a seventh operational element formed by a planet carrier of the third planetary gear set; and an eighth operational element formed by the sun gears of the third and fourth planetary gear sets.

The fifth operational element may form the second intermediate input path that is directly connected with the intermediate output path of the first shifting section and variably connected with the input shaft. The sixth operational element may form the first intermediate input path that is variably connected with the input shaft. The seventh operational element may form the final output path.

The sixth operational element that forms the first intermediate input path may be variably connected with the transmission housing so as to selectively act as a fixed element.

The sun gears of the third and fourth planetary gear sets forming the eighth operational element may be variably connected with the transmission housing such that they may simultaneously act as fixed elements or only one of them may act as a fixed element.

The sun gear of the third planetary gear set may be variably connected with the transmission housing.

The fifth operational element forming the second intermediate input path may be variably connected with the transmission housing so as to selectively act as a fixed element.

An exemplary gear train of an automatic transmission for a vehicle according to another embodiment of the present invention has first and second shifting sections and a plurality of friction members. The first shifting section comprises first and second planetary gear sets wherein a sun gear of the first planetary gear set is directly connected with a sun gear of the second planetary gear set, and a ring gear of the first planetary gear set is directly connected with a planet carrier of the second planetary gear set, such that the first shifting section forms four operational elements. The four operational elements of the first shifting section comprise first and second operational elements selectively acting as a fixed element, a third operational element acting as an intermediate output element, and a fourth operational element that always acts as an input element. The second shifting section comprises third and fourth planetary gear sets wherein a ring gear of the third planetary gear set is directly connected with a planet carrier of the fourth planetary gear set and sun gears of the third and fourth planetary gear sets are variably interconnected, such that the second shifting section forms four operational elements. The four operational elements of the second shifting section comprise a fifth operational element that is directly connected with the third operational element of the first shifting section and variably connected with the input shaft, a sixth operational element that is variably connected with the input shaft and variably connected with the transmission housing, a seventh operational element that always acts as an output element, and an eighth operational element that selectively acts as an idle element or a fixed element.

Each of the first, second, third, and fourth planetary gear sets may be a single pinion planetary gear set.

The first operational element may be formed by the sun gears of the first and second planetary gear sets. The second operational element may be formed by a planet carrier of the first planetary gear set. The third operational element may be formed by the ring gear of the first planetary gear set and the planet carrier of the second planetary gear set. The fourth operational element may be formed by a ring gear of the second planetary gear set.

The fifth operational element may be formed by a ring gear of the fourth planetary gear set. The sixth operational element may be formed by the ring gear of the third planetary gear set and the planet carrier of the fourth planetary gear set. The seventh operational element may be formed by a planet carrier of the third planetary gear set. The eighth operational element may be formed by the sun gears of the third and fourth planetary gear sets.

The sun gears of the third and fourth planetary gear sets forming the eighth operational element may be variably connected with the transmission housing such that they may simultaneously act as fixed elements or only one of them may act as a fixed element.

The sun gear of the third planetary gear set may be variably connected with the transmission housing.

The plurality of friction members may include: a first clutch disposed between the input shaft and the sixth operational element; a second clutch disposed between the input shaft and the fifth operational element; a third clutch disposed between the sun gears of the third and fourth planetary gear sets forming the eighth operational element; a first brake disposed between the second operational element and the transmission housing; a second brake disposed between the transmission housing and the sun gear of the third planetary gear set forming the eighth operational element; a third brake disposed between the first operational element and the transmission housing; and a fourth brake disposed between the sixth operational element and the transmission housing.

The first, second, third, and fourth planetary gear sets may be disposed in a sequence of first, second, third, and fourth planetary gear sets.

The first and third brakes may be disposed on an engine side of the first planetary gear set. The first and second clutches may be disposed between the second and third planetary gear sets. The third clutch and the second and fourth brakes may be disposed on a side of the fourth planetary gear set opposite the engine.

The plurality of friction members may further include a fifth brake disposed between the fifth operational element and the transmission housing.

BRIEF DESCRIPTION OF THE DRAWINGS

FIG. 2 is an operational chart of frictional members employed in a gear train according to a first exemplary embodiment of the present invention.

FIG. 5 is an operational chart of frictional members employed in a gear train according to a second exemplary embodiment of the present invention.

DETAILED DESCRIPTION OF THE PREFERRED EMBODIMENTS

An exemplary embodiment of the present invention will hereinafter be described in detail with reference to the accompanying drawings.

Figure 1:
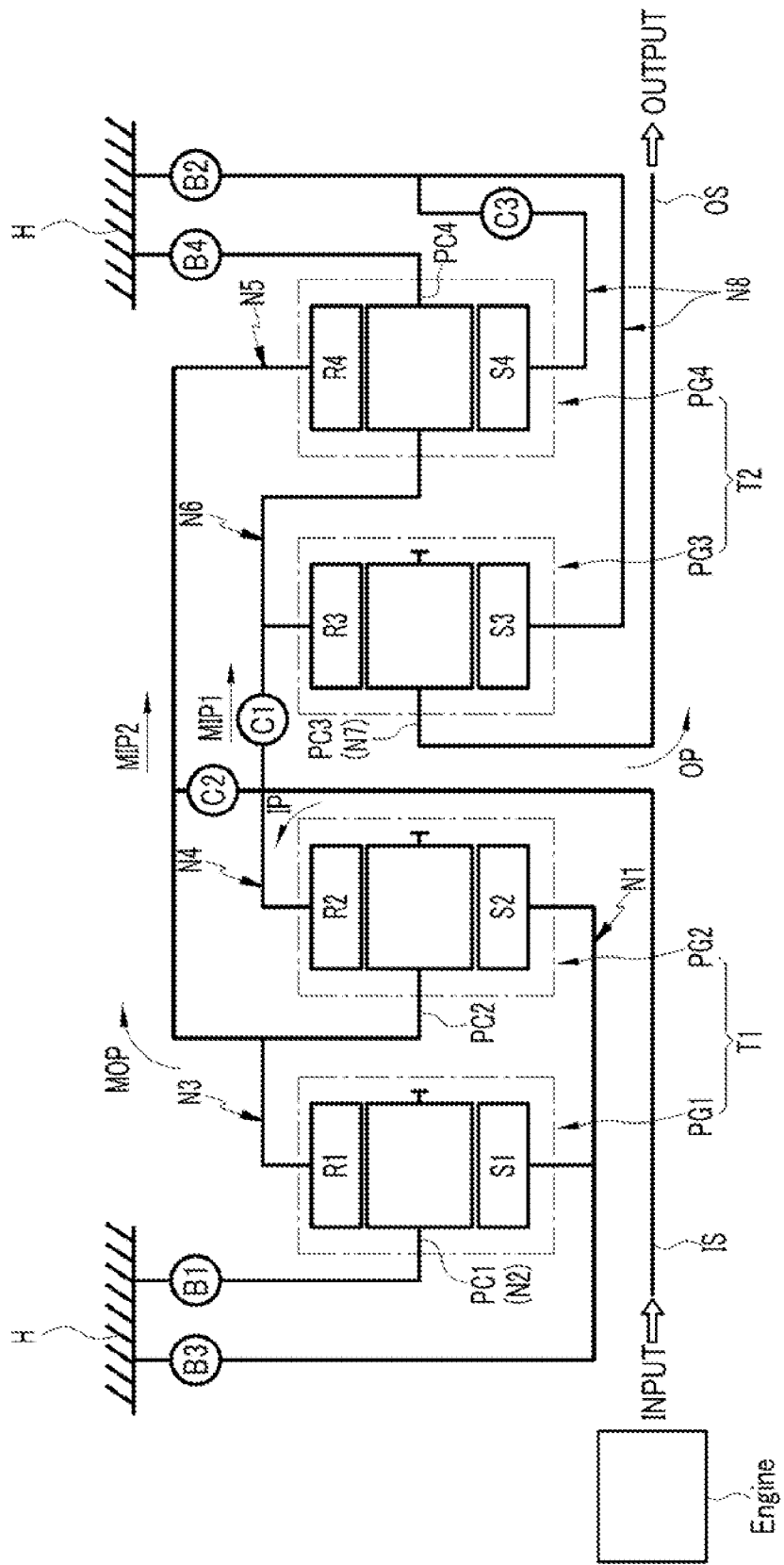
FIG. 1 is a schematic diagram of a gear train according to a first exemplary embodiment of the present invention.

Referring to FIG. 1, a gear train according to a first exemplary embodiment of the present invention includes first and second shifting sections T1 and T2. The first shifting section T1 includes first and second planetary gear sets PG1 and PG2, each of which is a single pinion planetary gear set. The second shifting section T2 includes third and fourth planetary gear sets PG1 and PG2, each of which is a single pinion planetary gear set. A rotation speed input through an input shaft IS is changed by the first and second shifting sections T1 and T2, and then output through an output shaft OS.

The input shaft IS may be a turbine shaft of a torque converter that receives engine torque through the torque converter. The output shaft OS outputs a drive torque to vehicle wheels through an output gear and a differential.

The first shifting section T1 selectively receives the engine speed through a single input path IP, and outputs a reduced speed through a single intermediate output path MOP.

To this end, a sun gear S1 of the first planetary gear set PG1 is directly connected with a sun gear S2 of the second planetary gear set PG2, and a ring gear R1 of the first planetary gear set PG1 is directly connected with a planet carrier PC2 of the second planetary gear set PG2.

Figure 3:
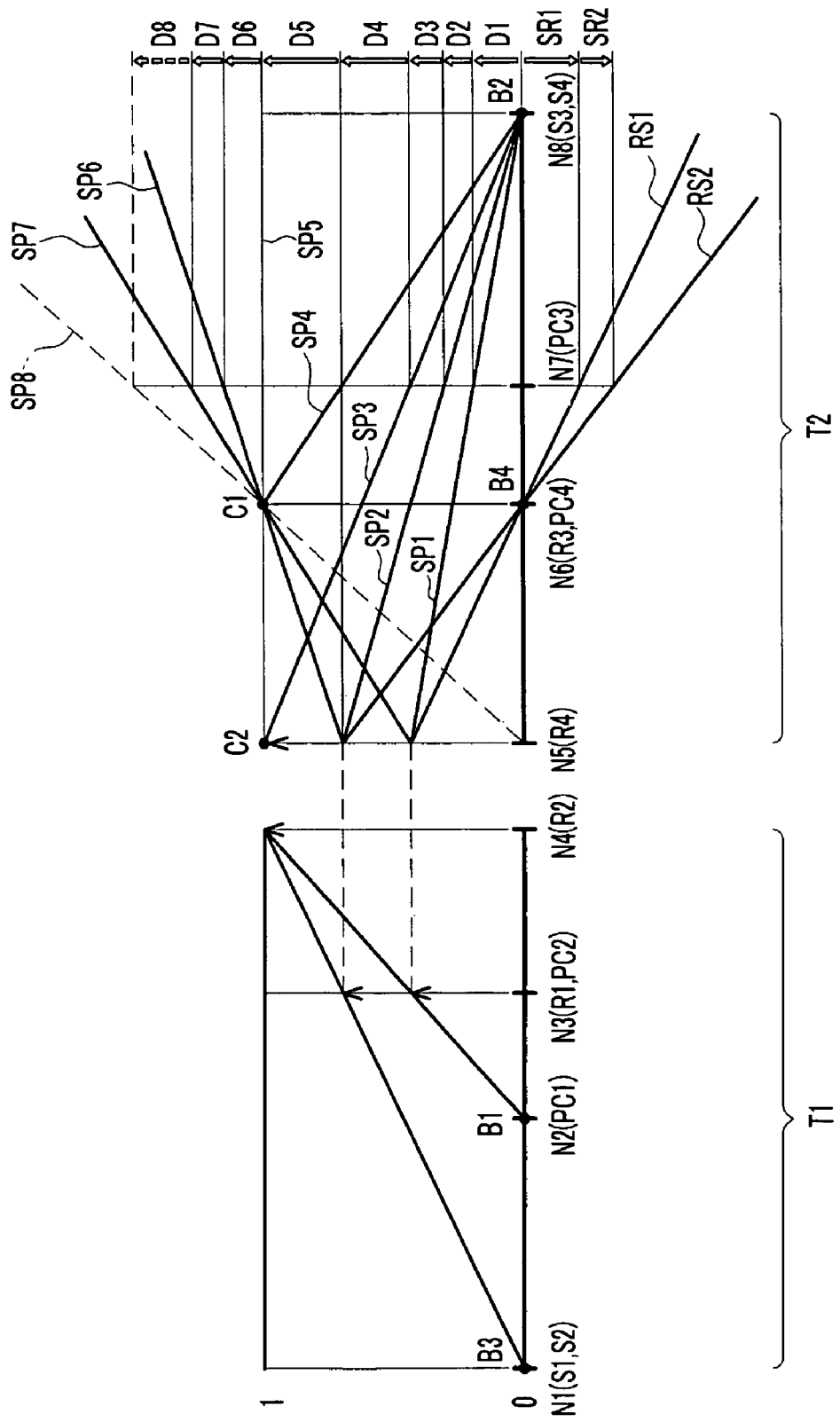
FIG. 3 is a speed diagram of a gear train according to exemplary embodiments of the present invention.

The first shifting section T1 thus has four operational elements, as shown in FIG. 3. The first operational element N1 is formed by the sun gears S1 and S2 of the first and second planetary gear sets PG1 and PG2. The second operational element N2 is formed by a planet carrier PC1 of the first planetary gear set PG1. The third operational element N3 is formed by the ring gear R1 of the first planetary gear set PG1 and the planet carrier PC2 of the second planetary gear set PG2. The fourth operational element N4 is formed by a ring gear R2 of the second planetary gear set PG2.

Referring back to FIG. 1, the first operational element N1 is connected with a transmission housing H interposing a third brake B3, and acts as a fixed element at the second forward speed and the sixth forward speed. The second operational element N2 is connected with the transmission housing H interposing a first brake B1, and acts as a fixed element at the first and seventh forward speeds and the first reverse speed.

The third operational element N3 is connected with one of intermediate input paths of the second shifting section T2 and forms an intermediate output path MOP. The fourth operational element N4 is directly connected with the input shaft IS, and forms an input path IP.

The second shifting section T2 receives a rotation speed through first and second intermediate input paths MIP1 and MIP2. The first intermediate input path MIP1 is variably connected with the input shaft IS. The second intermediate input path MIP2 is variably connected with the input shaft IS and fixedly connected with the intermediate output path MOP. Thus, the second shifting section T2 changes rotation speeds received through the first and second intermediate input paths MIP1 and MIP2, and outputs the changed rotation speed through a final output path OP.

To this end, a ring gear R3 of the third planetary gear set PG3 is directly connect with a planet carrier PC4 of the fourth planetary gear set PG4, and a sun gear S3 of the third planetary gear set PG3 is variably connected with a sun gear S4 of the fourth planetary gear set PG4 interposing a third clutch C3.

The second shifting section T2 thus has four operational elements of fifth, sixth, seventh, and eighth operational elements, as shown in FIG. 3.

The fifth operational element N5 is formed by a ring gear R4 of the fourth planetary gear set PG4. The sixth operational element N6 is formed by the ring gear R3 of the third planetary gear set PG3 and the planet carrier PC4 of the fourth planetary gear set PG4. The seventh operational element N7 is formed by a planet carrier PC3 of the third planetary gear set PG3. The eighth operational element N8 is formed by the sun gears S3 and S4 of the third and fourth planetary gear sets PG3 and PG4.

Referring back to FIG. 1, the fifth operational element N5 forms the second intermediate input path MIP2 by being directly connected with the intermediate output path MOP and being variably connected with the input shaft IS interposing a second clutch C2. The fifth operational element N5 acts as an input element at first, second, third, fourth, and fifth forward speeds and first and second reverse speeds.

The sixth operational element N6 forms the first intermediate input path MIP1 by being variably connected with the input shaft IS interposing a first clutch C1. The sixth operational element N6 acts as an input element at fourth, fifth, sixth, and seventh forward speeds. The sixth operational element N6 is variably connected with the transmission housing H interposing a fourth brake B4, and it acts as a fixed element at the first and second reverse speeds.

The seventh operational element N7 is connected with the output shaft OS so as to form the final output path OP, and always acts as an output element.

Regarding the eighth operational element N8, the sun gear S3 of the third planetary gear set PG3 is connected with the transmission housing H interposing a second brake B2. The eighth operational element N8 may thus selectively act as a fixed element and an idle element. At the first, second, and third forward speeds, the third clutch C3 and the second brake B2 simultaneously operate and thus the eighth operational element N8 acts as a fixed element. At the fourth forward speed, the eighth operational element N8 can still act as a fixed element since the second brake B2 operates although the third clutch C3 does not. The eighth operational element N8 acts as an idle element at the fifth, sixth, and seventh forward speeds and the first and second reverse speeds.

The first, second, and third clutches C1, C2, and C3 and the first, second, third, and fourth brakes B1, B2, B3, and B4 can each be a multi-plate hydraulic pressure friction device that is frictionally engaged by hydraulic pressure.

As shown in FIG. 2, three friction members operate in each speed according to a gear train of the first exemplary embodiment of the present invention.

In FIG. 3, the lower horizontal line indicates 0 (zero) rotation speed, and the upper horizontal line indicates 1.0 rotation speed (i.e., the same rotation speed as the input shaft IS).

The four vertical lines of the first shifting section T1 correspond to, sequentially from left to right, the first operational element N1, i.e. the sun gears S1 and S2 of the first and second planetary gear sets PG1 and PG2, the second operational element N2, i.e. the planet carrier PC1 of the first planetary gear set PG1, the third operational element N3, i.e. the ring gear R1 of the first planetary gear set PG1 and the planet carrier PC2 of the second planetary gear set PG2, and the fourth operational element N4, i.e. the ring gear R2 of the second planetary gear set PG2. The horizontal spacing between the four vertical lines depends on sun gear/ring gear teeth ratios of the first and second planetary gear sets PG1 and PG2.

The vertical lines of the second shifting section T2 correspond to, sequentially from the left to the right, the fifth operational element N5, i.e. the ring gear R4 of the fourth planetary gear set PG4, the sixth operational element N6, i.e. the ring gear R3 of the third planetary gear set PG3 and the planet carrier PC4 of the fourth planetary gear set PG4, the seventh operational element N7, i.e. the planet carrier PC3 of the third planetary gear set PG3, and the eighth operational element N8, i.e. the sun gears S3 and S4 of the third and fourth planetary gear sets PG3 and PG4. The horizontal spacing between the four vertical lines depends on sun gear/ring gear teeth ratios of the third and fourth planetary gear sets PG3 and PG4.

<The First Forward Speed>

At the first forward speed, the third clutch C3 and the first and second brakes B1 and B2 operate, as shown in FIG. 2.

Then, in the first shifting section T1, the second operational element N2 acts as a fixed element by the operation of the first brake B1 while the fourth operational element N4 receives an input speed. Therefore, a reduced speed is output from the first shifting section T1 through the third operational element N3 (refer to FIG. 3).

In the second shifting section T2, the eighth operational element N8 acts as a fixed element by the operation of the second brake B2 and the third clutch C3 while the reduced speed of the third operational element N3 is input to the fifth operational element N5. Therefore, a first forward speed line SP1 is formed, and a further reduced speed is output from the seventh operational element N7. That is, the final output speed of the gear train is at a height D1 of the first forward speed line SP1 at the position of the seventh operational element N7, and thus the first forward speed is attained.

<The Second Forward Speed>

At the second forward speed, the first brake B1 that operated at the first forward speed is released, and the third brake B3 is controlled to operate.

Then, similarly to the first forward speed, the first operational element N1 in the first shifting section T1 acts as a fixed element by the operation of the third brake B3 while the fourth operational element N4 receives an input speed. Therefore, a reduced speed is output from the first shifting section T1 through the third operational element N3.

In the second shifting section T2, the same as in the first forward speed, the eighth operational element N8 acts as a fixed element by the operation of the second brake B2 and the third clutch C3 while the reduced speed of the third operational element N3 is input to the fifth operational element N5. Therefore, a second forward speed line SP2 is formed, and a further reduced speed is output from the seventh operational element N7. That is, the final output speed of the gear train is at a height D2 of the second forward speed line SP2 at the position of the seventh operational element N7, and thus the second forward speed is attained.

<The Third Forward Speed>

At the third forward speed, the third brake B3 that operated at the second forward speed is released, and the second clutch C2 is controlled to operate.

Then, the first shifting section T1 does not contribute to the speed change and directly output the inputted engine speed, since the first and second planetary gears PG1 and PG2 merely integrally rotate.

In the second shifting section T2, similarly to the second forward speed, the eighth operational element N8 acts as a fixed element by the operation of the second brake B2 and the third clutch C3 while the fifth operational element N5 receives the engine speed from the first shifting section T1 and the input shaft IS via the second clutch C2. Therefore, a third forward speed line SP3 is formed, and a reduced speed is output from the seventh operational element N7. That is, the final output speed of the gear train is at a height D3 of the third forward speed line SP3 at the position of the seventh operational element N7, and thus the third forward speed is attained.

<The Fourth Forward Speed>

At the fourth forward speed, the third clutch C3 that operated at the third forward speed is released, and the first clutch C1 is controlled to operate.

Then, the same as in the third forward speed, the first shifting section T1 does not contribute to the speed change and directly output the inputted engine speed, since the first and second planetary gears PG1 and PG2 merely integrally rotate by the operation of the second clutch C2.

In the second shifting section T2, the eighth operational element N8 acts as a fixed element by the operation of the second brake B2 while the sixth operational element N6 (more specifically, the ring gear R3 of the third planetary gear set PG3) receives the engine speed from the input shaft IS via the first clutch C1. Therefore, a fourth forward speed line SP4 is formed, and a reduced speed is output from the seventh operational element N7. That is, the final output speed of the gear train is at a height D4 of the fourth forward speed line SP4 at the position of the seventh operational element N7, and thus the fourth forward speed is attained.

<The Fifth Forward Speed>

At the fifth forward speed, the second brake B2 that operated at the fourth forward speed is released, and the third clutch C3 is controlled to operate.

Then, the same as in the third forward speed, the first shifting section T1 does not contribute to the speed change and directly output the inputted engine speed, since the first and second planetary gears PG1 and PG2 merely integrally rotate by the operation of the second clutch C2.

In addition, in the second shifting section T2, the third and fourth planetary gear sets PG3 and PG4 integrally rotate due to the simultaneous operation of the first, second, and third clutches C1, C2, and C3. Therefore, a fifth forward speed line SP5 is formed, and the same speed as the input speed is output from the seventh operational element N7. That is, the final output speed of the gear train is at a height D5 of the fifth forward speed line SP5 at the position of the seventh operational element N7, and thus the fifth forward speed is attained.

<The Sixth Forward Speed>

At the sixth forward speed, the second clutch C2 that operated at the fifth forward speed is released, and the third brake B3 is controlled to operate.

Then, the same as in the second forward speed, the first operational element N1 in the first shifting section T1 acts as a fixed element by the operation of the third brake B3 while the fourth operational element N4 receives an input speed. Therefore, a reduced speed is output from the first shifting section T1 through the third operational element N3.

In the second shifting section T2, the sixth operational element N6 receives the engine speed by the operation of the first clutch C1 while the reduced speed of the third operational element N3 is input to the fifth operational element N5. Therefore, a sixth forward speed line SP6 is formed, and an increased speed is output from the seventh operational element N7. That is, the final output speed of the gear train is at a height D6 of the sixth forward speed line SP6 at the position of the seventh operational element N7, and thus the sixth forward speed is attained.

<The Seventh Forward Speed>

At the seventh forward speed, the third brake B3 that operated at the sixth forward speed is released, and the first brake B1 is controlled to operate.

Then, the same as in the first forward speed, the second operational element N2 in the first shifting section T1 acts as a fixed element by the operation of the first brake B1 while the fourth operational element N4 receives an input speed. Therefore, a reduced speed is output from the first shifting section T1 through the third operational element N3.

In the second shifting section T2, the sixth operational element N6 receives the engine speed by the operation of the first clutch C1 while the reduced speed of the third operational element N3 is input to the fifth operational element N5. Therefore, a seventh forward speed line SP7 is formed, and an increased speed is output from the seventh operational element N7. That is, the final output speed of the gear train is at a height D7 of the seventh forward speed line SP7 at the position of the seventh operational element N7, and thus the seventh forward speed is attained.

<The First Reverse Speed>

At the first reverse speed, the third clutch C3 and the first and fourth brakes B1 and B4 are controlled to operate.

Then, in the first shifting section T1, the second operational element N2 acts as a fixed element by the operation of the first brake B1 while the fourth operational element N4 receives an input speed. Therefore, a reduced speed is output from the first shifting section T1 through the third operational element N3.

In the second shifting section T2, the sixth operational element N6 acts as a fixed element by the operation of the fourth brake B4 while the reduced speed of the third operational element N3 is input to the fifth operational element N5. Therefore, a first reverse speed line RS1 is formed, and a negative reduced speed is output from the seventh operational element N7. That is, the final output speed of the gear train is at a height SR1 of the first reverse speed line RS1 at the position of the seventh operational element N7, and thus the first reverse speed is attained.

<The Second Reverse Speed>

At the second reverse speed, the first brake B1 that operated at the first reverse speed is released, and the third brake B3 is controlled to operate.

Then, in the first shifting section T1, the first operational element N1 acts as a fixed element by the operation of the third brake B3 while the fourth operational element N4 receives an input speed. Therefore, a reduced speed is output from the first shifting section T1 through the third operational element N3.

In the second shifting section T2, the sixth operational element N6 acts as a fixed element by the operation of the fourth brake B4 while the reduced speed of the third operational element N3 is input to the fifth operational element N5. Therefore, a second reverse speed line RS2 is formed, and a negative reduced speed is output from the seventh operational element N7. That is, the final output speed of the gear train is at a height SR2 of the second reverse speed line RS2 at the position of the seventh operational element N7, and thus the second reverse speed is attained.

Figure 4:
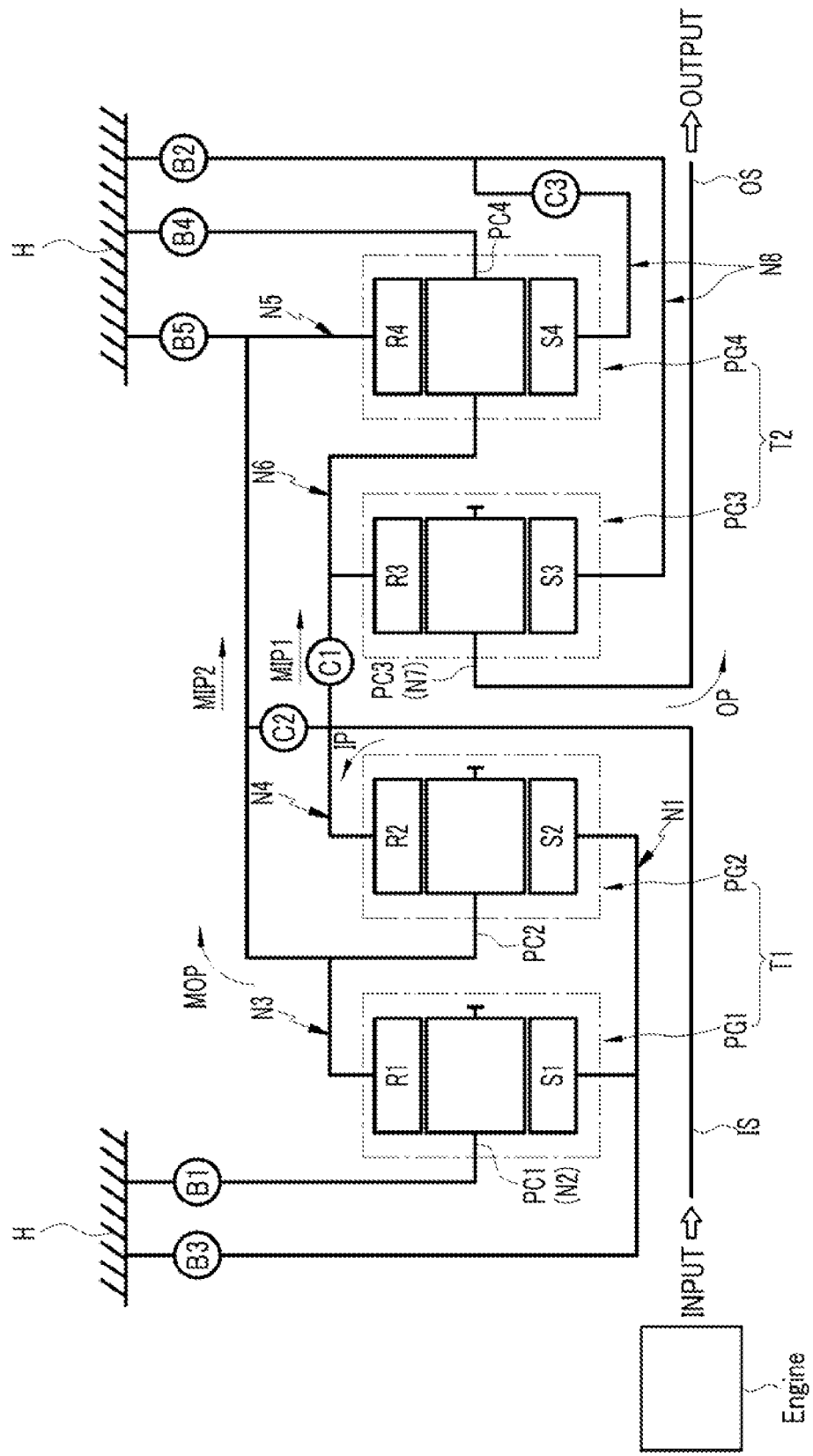
FIG. 4 is a schematic diagram of a gear train according to a second exemplary embodiment of the present invention.

Referring to FIG. 4, a gear train according to a second exemplary embodiment is mostly the same as the gear train according to the first exemplary embodiment. However, an eighth forward speed can be attained in the gear train of the second exemplary embodiment by an a fifth brake B5 between the transmission housing H and the ring gear R4 of the fourth planetary gear set PG4.

Shifting operation for the first to seventh forward speeds and the two reverse speeds according to a gear train of the present exemplary embodiment is the same as in the gear grain of the first exemplary embodiment.

As shown in FIG. 5, at the eighth forward speed, the first brake B1 that operated at the seventh forward speed is released, and the fifth brake B5 is controlled to operate.

Then, the first shifting section T1 does not contribute to the speed change and can merely passively rotate, since none of the first and third brakes B1 and B3 and the second clutch C2 operates.

In the second shifting section T2, the fifth operational element N8 acts as a fixed element by the operation of the fifth brake B5 while the sixth operational element N6 (more specifically, the ring gear R3 of the third planetary gear set PG3) receives the engine speed from the input shaft IS via the first clutch C1. Therefore, an eighth forward speed line SP8 (shown as a dotted line in FIG. 3) is formed, and an increased speed is output from the seventh operational element N7. That is, the final output speed of the gear train is at a height D8 of the eighth forward speed line SP8 at the position of the seventh operational element N7, and thus the eighth forward speed is attained.

As described above, according to an exemplary embodiment of the present invention, seven or eight forward speeds and two reverse speeds are achieved by using four simple planetary gear sets in combination with three clutches and four or five brakes. According to such a gear train, power transmission performance of an automatic transmission may be improved, and fuel consumption may be reduced. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gear train of an automatic transmission for a vehicle having first and second shifting sections and a plurality of friction members, wherein:
    the first shifting section includes first and second simple planetary gear sets forming a first input path for directly receiving an input shaft rotation speed and an intermediate output path for outputting a reduced speed of the first shifting section; and
    the second shifting section includes third and fourth simple planetary gear sets forming a first intermediate input path for variably receiving an input shaft rotation speed, a second intermediate input path for receiving the reduced speed of the first shifting section through the intermediate output path and for variably receiving the input shaft rotation speed, and a final output path for outputting a modified speed of the second shifting section; and
    wherein:
        a sun gear of the first simple planetary gear set is connected to a sun gear of the second simple planetary gear set; and
        a ring gear of the first simple planetary gear set is connected to a planet carrier of the second simple planetary gear set,
        such that the first shifting section comprises four operational elements.

2. The gear train of claim 1 wherein each of the first, second, third, and fourth simple planetary gear sets is a single pinion simple planetary gear set.

3. The gear train of claim 1, wherein the four operational elements comprise:
    a first operational element comprising the sun gears of the first and second simple planetary gear sets;
    a second operational element comprising a planet carrier of the first simple planetary gear set;
    a third operational element comprising the ring gear of the first simple planetary gear set and the planet carrier of the second simple planetary gear set; and
    a fourth operational element formed by a ring gear of the second simple planetary gear set.

4. The gear train of claim 3, wherein:
    the fourth operational element is connected to the input shaft to form the first input path;
    the third operational element forms the intermediate output path; and
    the first and second operational elements selectively act as a fixed element.

5. The gear train of claim 1, wherein:
    a ring gear of the third simple planetary gear set is connected to a planet carrier of the fourth simple planetary gear set;
    a sun gear of the third simple planetary gear set and a sun gear of the fourth simple planetary gear set are variably interconnected,
    such that the second shifting section comprises four operational elements.

6. The gear train of claim 5, wherein the four operational elements comprise:
    a fifth operational element comprising a ring gear of the fourth simple planetary gear set;
    a sixth operational element comprising the ring gear of the third simple planetary gear set and the planet carrier of the fourth simple planetary gear set;
    a seventh operational element comprising a planet carrier of the third simple planetary gear set; and
    an eighth operational element comprising the sun gears of the third and fourth simple planetary gear sets.

7. The gear train of claim 6, wherein:
    the fifth operational element forms the second intermediate input path that is directly connected with the intermediate output path of the first shifting section and variably connected with the input shaft;
    the sixth operational element forms the first intermediate input path that is variably connected with the input shaft; and
    the seventh operational element forms the final output path.

8. The gear train of claim 7, wherein the sixth operational element that forms the first intermediate input path is variably connected with a transmission housing so as to selectively act as a fixed element.

9. The gear train of claim 7, wherein the fifth operational element is variably connected with the transmission housing so as to selectively act as a fixed element.

10. The gear train of claim 6, wherein the sun gears of the third and fourth simple planetary gear sets are variably connected with a transmission housing such that they may simultaneously act as fixed elements or only one of them may act as a fixed element.

11. The gear train of claim 10, wherein the sun gear of the third simple planetary gear set is variably connected with the transmission housing.

12. A gear train of an automatic transmission for a vehicle having first and second shifting sections and a plurality of friction members, wherein the first shifting section comprises first and second simple planetary gear sets wherein a sun gear of the first simple planetary gear set is connected to a sun gear of the second simple planetary gear set and a ring gear of the first simple planetary gear set is connected to a planet carrier of the second simple planetary gear set, such that the first shifting section comprises first and second operational elements, each selectively acting as a fixed element, a third operational element acting as an intermediate output element, and a fourth operational element that always acts as an input element;

the second shifting section comprises third and fourth simple planetary gear sets wherein a ring gear of the third simple planetary gear set is connected to a planet carrier of the fourth simple planetary gear set and a sun gear of the third simple planetary gear set is variably connected to a sun gear of the fourth simple planetary gear set, such that the second shifting section comprises a fifth operational element that is connected to the third operational element and variably connected to the input shaft, a sixth operational element that is variably connected to the input shaft and variably connected to a transmission housing, a seventh operational element that always acts as an output element, and an eighth operational element that selectively acts as an idle element or a fixed element.

13. The gear train of claim 12, wherein each of the first, second, third, and fourth simple planetary gear sets is a single pinion simple planetary gear set.

14. The gear train of claim 12, wherein:
the first operational element comprises the sun gears of the first and second simple planetary gear sets;
the second operational element comprises a planet carrier of the first simple planetary gear set;
the third operational element comprises the ring gear of the first simple planetary gear set and the planet carrier of the second simple planetary gear set; and
the fourth operational element comprises a ring gear of the second simple planetary gear set.

15. The gear train of claim 12, wherein:
the fifth operational element comprises a ring gear of the fourth simple planetary gear set;
the sixth operational element comprises the ring gear of the third simple planetary gear set and the planet carrier of the fourth simple planetary gear set;
the seventh operational element comprises a planet carrier of the third simple planetary gear set; and
the eighth operational element comprises the sun gears of the third and fourth simple planetary gear sets.

16. The gear train of claim 15, wherein the sun gears of the third and fourth simple planetary gear sets are variably connected to the transmission housing such that they may simultaneously act as fixed elements or only one of them may act as a fixed element.

17. The gear train of claim 16, wherein the sun gear of the third simple planetary gear set is variably connected to the transmission housing.

18. The gear train of claim 12, wherein the plurality of friction members comprises:
a first clutch disposed between the input shaft and the sixth operational element;
a second clutch disposed between the input shaft and the fifth operational element;
a third clutch disposed between the sun gears of the third and fourth simple planetary gear sets;
a first brake disposed between the second operational element and the transmission housing;
a second brake disposed between the transmission housing and the sun gear of the third simple planetary gear set;
a third brake disposed between the first operational element and the transmission housing; and
a fourth brake disposed between the sixth operational element and the transmission housing.

19. The gear train of claim 18, wherein:
the first and third brakes are disposed on a side of the first simple planetary gear set facing an engine;
the first and second clutches are disposed between the second and third simple planetary gear sets; and
the third clutch and the second and fourth brakes are disposed on a side of the fourth simple planetary gear set opposite the engine.

20. The gear train of claim 12, wherein the first, second, third, and fourth simple planetary gear sets are disposed in a sequence of first, second, third, and fourth simple planetary gear sets.

21. The gear train of claim 12, wherein the plurality of friction members comprises:
a first clutch disposed between the input shaft and the sixth operational element;
a second clutch disposed between the input shaft and the fifth operational element;
a third clutch disposed between the sun gears of the third and fourth simple planetary gear sets;
a first brake disposed between the second operational element and the transmission housing;
a second brake disposed between the transmission housing and the sun gear of the third simple planetary gear set;
a third brake disposed between the first operational element and the transmission housing;
a fourth brake disposed between the sixth operational element and the transmission housing; and
a fifth brake disposed between the fifth operational element and the transmission housing.

* * * * *